(12) United States Patent
Huang et al.

(10) Patent No.: US 12,722,672 B2
(45) Date of Patent: Sep. 1, 2026

(54) DEVICE AND METHOD FOR MONITORING RAILWAY HEALTH IN LARGE WINDY DESERT AREA

(71) Applicant: Lanzhou University, Lanzhou (CN)

(72) Inventors: Ning Huang, Lanzhou (CN); Yanhong Song, Lanzhou (CN); Jianyong Xie, Lanzhou (CN); Lihang Xu, Lanzhou (CN); Guowei Xin, Lanzhou (CN); Jie Zhang, Lanzhou (CN); Xuanmin Li, Lanzhou (CN); Yongqing Yang, Lanzhou (CN)

(73) Assignee: Lanzhou University, Lanzhou (CN)

( * ) Notice: Subject to any disclaimer, the term of this patent is extended or adjusted under 35 U.S.C. 154(b) by 384 days.

(21) Appl. No.: 18/606,054

(22) Filed: Mar. 15, 2024

(65) Prior Publication Data

US 2024/0308556 A1 Sep. 19, 2024

(30) Foreign Application Priority Data

Mar. 17, 2023 (CN) ........................ 202310265036.1

(51) Int. Cl.
*B61L 23/04* (2006.01)
*B61K 9/08* (2006.01)
(Continued)

(52) U.S. Cl.
CPC .............. *B61L 23/042* (2013.01); *B61K 9/08* (2013.01); *G01H 13/00* (2013.01); *G01H 17/00* (2013.01); *G01P 15/093* (2013.01)

(58) Field of Classification Search
CPC .... B61L 23/042; B61L 23/048; B61L 23/041; B61L 23/04; B61L 27/53; B61L 23/047;
(Continued)

(56) References Cited

U.S. PATENT DOCUMENTS 6,532,038 B1 * 3/2003 Haring .................. B61L 23/041 348/148
9,365,983 B2 * 6/2016 Zeng ....................... E01B 31/18
(Continued)

FOREIGN PATENT DOCUMENTS

CN 102092404 A * 6/2011 ............ B61L 23/041
CN 110588710 A * 12/2019 ............ B61L 23/045
(Continued)

*Primary Examiner* — Cheng Lin
(74) *Attorney, Agent, or Firm* — Hemisphere Law, PLLC

(57) ABSTRACT

A device and a method for monitoring railway health in a windy desert area are provided, belonging to the field of equipment for monitoring sand accumulation of railway ballast bed. A spring vibration assembly is fixedly connected to a bracket, and the bracket and a housing are fixedly connected through fastening screws. A light-emitting diode (LED) emitter and a receiving processing assembly are fixedly connected to the housing by adhesive bonding; and the receiving processing assembly, the LED emitter and a mass ball at an equilibrium position are installed on a same straight line. The device is a novel structure, using mechanical spring vibrator as a vibration characteristic sensing unit, adapting to harsh climatic conditions in desert, greatly reducing maintenance cost, and using photoelectric sensing as a signal receiving unit, which greatly improves response speed. The device can be widely applied to railway health monitoring in large windy desert environment.

6 Claims, 7 Drawing Sheets

(51) Int. Cl.

| | |
|---|---|
| ***G01H 13/00*** | (2006.01) |
| ***G01H 17/00*** | (2006.01) |
| ***G01P 15/093*** | (2006.01) |

(58) Field of Classification Search

CPC .......... B61K 9/08; G01H 17/00; G01H 13/00; G01P 15/093

See application file for complete search history.

(56) References Cited

U.S. PATENT DOCUMENTS

| | | | | |
|---|---|---|---|---|
| 10,807,623 | B2 * | 10/2020 | Mesher | G01S 19/45 |
| 11,608,668 | B2 * | 3/2023 | Hotomi | G01K 13/00 |
| 2021/0078619 | A1 * | 3/2021 | Morita | B61L 15/0027 |
| 2024/0343282 | A1 * | 10/2024 | Srisooksai | B60L 15/40 |

FOREIGN PATENT DOCUMENTS

| | | | | |
|---|---|---|---|---|
| CN | 110966987 | A * | 4/2020 | G01C 9/00 |
| CN | 112414367 | A * | 2/2021 | G01C 5/00 |
| CN | 112896231 | A * | 6/2021 | H04N 23/80 |
| CN | 113390504 | A * | 9/2021 | G01H 17/00 |
| CN | 113815680 | A * | 12/2021 | B61L 23/00 |
| CN | 114838811 | A * | 8/2022 | H05K 7/20136 |
| EP | 1319751 | A2 * | 6/2003 | B61L 23/041 |
| EP | 1310801 | A1 * | 5/2013 | G01H 9/006 |
| WO | WO-2015096909 | A1 * | 7/2015 | B61L 23/041 |

* cited by examiner

DEVICE AND METHOD FOR MONITORING RAILWAY HEALTH IN LARGE WINDY DESERT AREA

TECHNICAL FIELD

The disclosure relates to the technical field of equipment for monitoring sand accumulation on railway ballast bed, and more particularly to a device and a method for monitoring railway health in a large windy desert area.

BACKGROUND

There are a large number of desert railways in northwest China, which are often threatened by sandstorms. Acolian sand will cause railway ballast bed hardening, affect driving performance, and even bury rails, causing accidents such as train derailment. The reality is that it is still difficult to monitor the amount of wind-induced sand accumulation on long railway lines because of frequent transit of wind and sand. At present, the main work is to rely on manual field survey and regularly cleaning up the sand accumulated on the ballast bed of desert railway to ensure the healthy operation of the railway. Therefore, it is of great significance to install a railway health monitoring device to reduce railway maintenance costs and provide early warning of wind-induced sand accumulation for railways in areas with serious sandstorms.

SUMMARY

The disclosure provides a device and a method for monitoring railway health in a large windy desert area, which are used for real-time monitoring sand accumulation on railway ballast beds and making early warning for railway health in areas with severe windy and dusty conditions.

Technical solutions adopted by the disclosure are as follows. Specifically, a device for monitoring railway health in a large windy desert area includes a spring vibration assembly, a bracket, a housing, a light-emitting diode (LED) emitter, a receiving processing assembly and fixing screws. The spring vibration assembly and the bracket are fixedly connected through a base threaded stud and a positioning nut, and the bracket and the housing are fixedly connected through the fixing screws. The LED emitter and the receiving processing assembly are fixedly connected to the housing by adhesive bonding. The receiving processing assembly, the LED emitter and the mass ball in an equilibrium position are installed on a same straight line, so that it is ensured that a light emitted by the LED emitter is smoothly received by the receiving processing assembly when the light is unobstructed by the mass ball.

In an embodiment, the spring vibration assembly includes a mass ball, a spring, the base threaded stud and the positioning nut. The mass ball is fixedly connected to a top of the spring, the base threaded stud is fixedly connected to a bottom of the spring, and a lower part of the base threaded stud is connected to the positioning nut in threaded connection.

In an embodiment, the bracket includes a base and an upper bracket, and a bottom of the upper bracket is fixedly connected to the base.

In an embodiment, the receiving processing assembly of the disclosure adopts a photosensitive triode, and the photosensitive triode is configured (i.e., structured and arranged) to convert a received optical signal into indication information or an electrical signal capable of being processed by a computer.

The disclosure relates to a monitoring method adopting the device for monitoring railway health in the windy desert area, which includes the following steps:

step (1), fixing the whole device on a bed timber of a monitoring point of a railway line with wind and sand by connecting bolt groups;

step (2), driving the mass ball in the spring vibration assembly by a train to vibrate when the train passes by, making the mass ball deviate from an equilibrium position and the light emitted by the LED emitter be received by the receiving processing assembly, after illuminating a photosensitive triode in the receiving processing assembly, conducting a circuit of the receiving processing assembly, making an indicator light flash, obtaining a conducted electrical signal by a computer through an external circuit, and recording a power-on duration; and step (3), judging sand accumulation in a railway track according to the power-on duration or a flashing duration of the indicator light, so as to achieve real-time monitoring of the sand accumulation in the railway track.

In an embodiment, in the step (3) of the disclosure, the power-on duration or the flashing duration of the indicator light is:

$$T = \frac{K}{m + m_t};$$

where, T is the flashing duration of the indicator light of the device after the train passes;

K is a response constant of the device;

m is a system mass; and $m_t$ is added mass of the system after sand accumulation.

The disclosure has the advantages that the structure is novel, the mechanical spring vibrator is used as the vibration characteristic sensing unit, which adapts to the harsh climatic conditions in the desert, thus greatly reducing the maintenance cost. The photoelectric sensing (i.e., the photosensitive triode) is used as a receiving unit of the system signal, thus greatly improving the response speed of the system. When there is sand accumulation in the track, the vibration characteristics of the train passing through change, and at this time, the added mass $m_t$ of the whole monitoring device increases, making the whole monitoring device return to the equilibrium position in a relatively short time, so that the flashing duration of the indicator light will be reduced. In this situation, the real-time detection of the sand accumulation inside the railway track can be achieved by monitoring the change of the vibration characteristics of the whole system. The disclosure has the advantages of convenient operation, strong practicability, capability of monitoring the sand accumulation on the ballast bed, early warning of the sand accumulation, convenience for railway maintenance and cleaning of the sand accumulation, easy operation, low cost, small volume, easy implementation, rapid layout and reliable performance, and can be widely applied to railway health monitoring in the large windy desert environment.

DETAILED DESCRIPTION OF EMBODIMENTS

Figure 1:
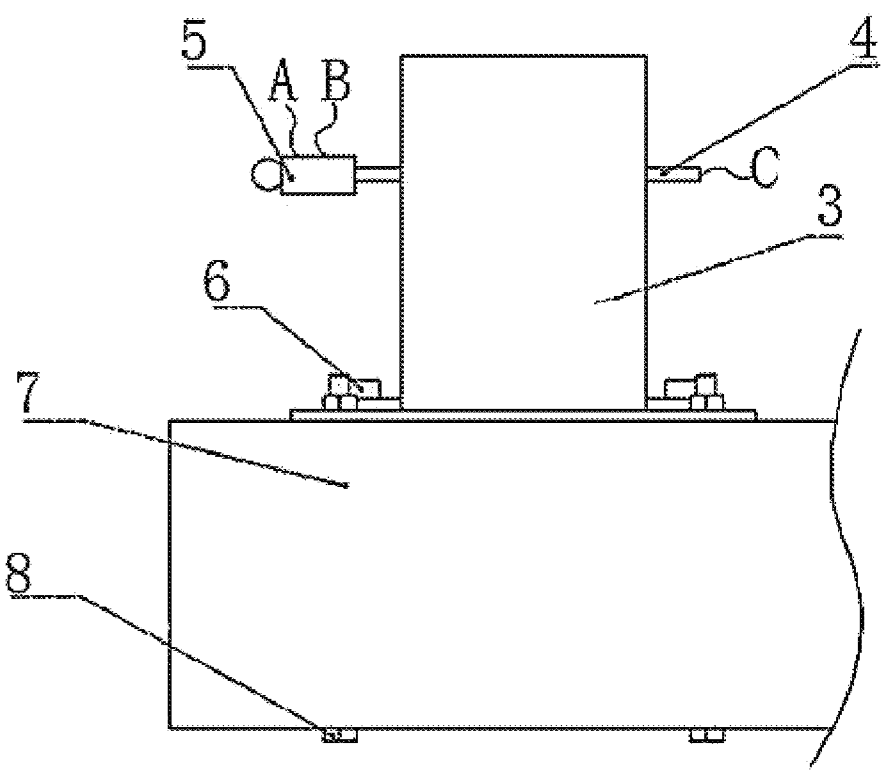
FIG. 1 illustrates a schematic structural diagram of a device for monitoring railway health in a large windy desert area of the disclosure.
Figure 2:
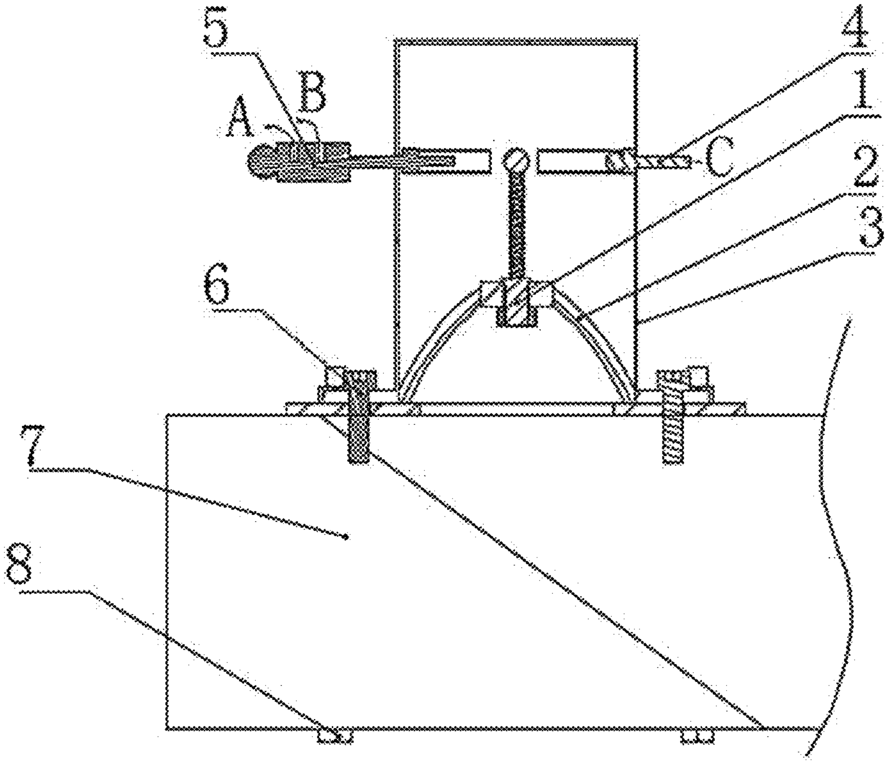
FIG. 2 illustrates a sectional view of the device for monitoring railway health in the large windy desert area of the disclosure.
Figure 3:
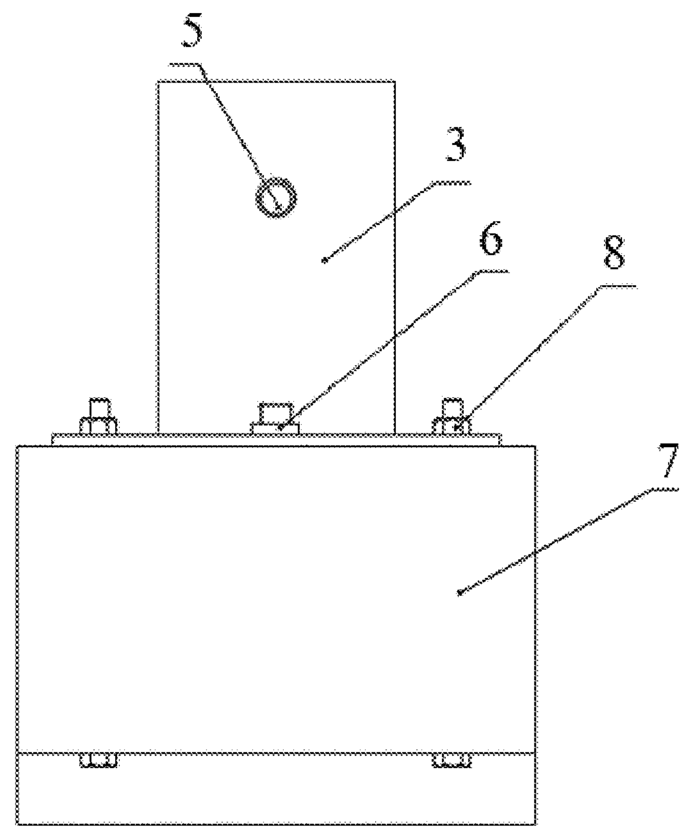
FIG. 3 illustrates a left side view of FIG. 1.
Figure 4:
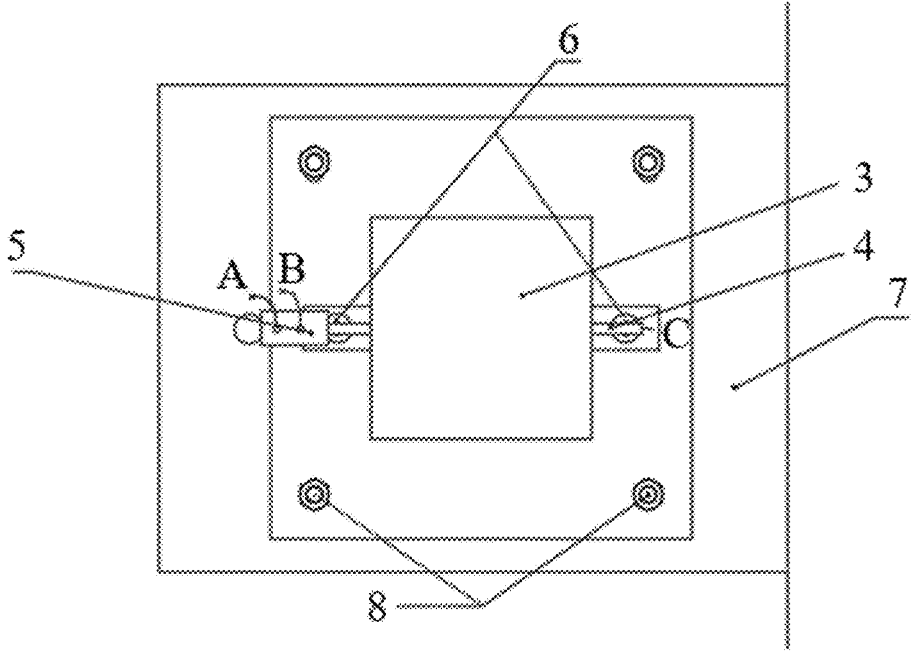
FIG. 4 illustrates a top view of FIG. 1.
Figure 5:
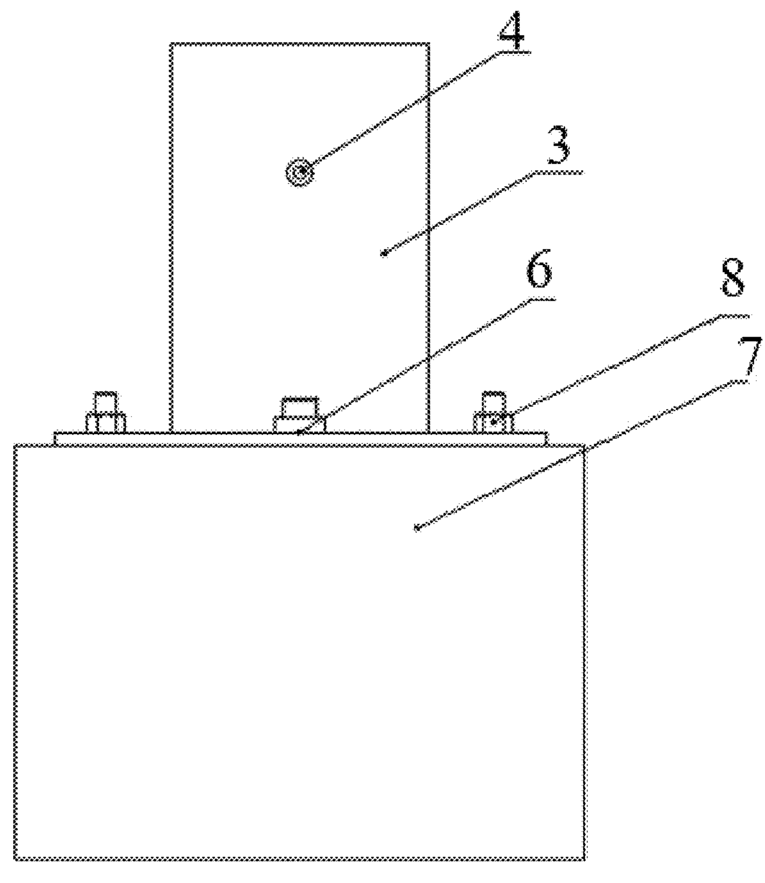
FIG. 5 illustrates a right side view of FIG. 1.

As shown in FIGS. 1-5, a device for monitoring railway health in a large windy desert area includes a spring vibration assembly 1, a bracket 2, a housing 3, a light-emitting diode (LED) emitter 4, a receiving processing assembly 5, and fixing screws 6. The spring vibration assembly 1 and the bracket 2 are fixedly connected through a base threaded stud 103 and a positioning nut 104, the bracket 2 and the housing 3 are fixedly connected through the fixing screws 6, and the LED emitter 4 and the receiving processing assembly 5 are fixedly connected to the housing 3 by adhesive bonding. The receiving processing assembly 5, the LED emitter 4 and a mass ball 101 at an equilibrium position are installed on the same straight line, so as to ensure that the light emitted by the LED emitter 4 can be smoothly received by the receiving processing assembly 5 when the light is unobstructed by the mass ball 101.

Figure 7:
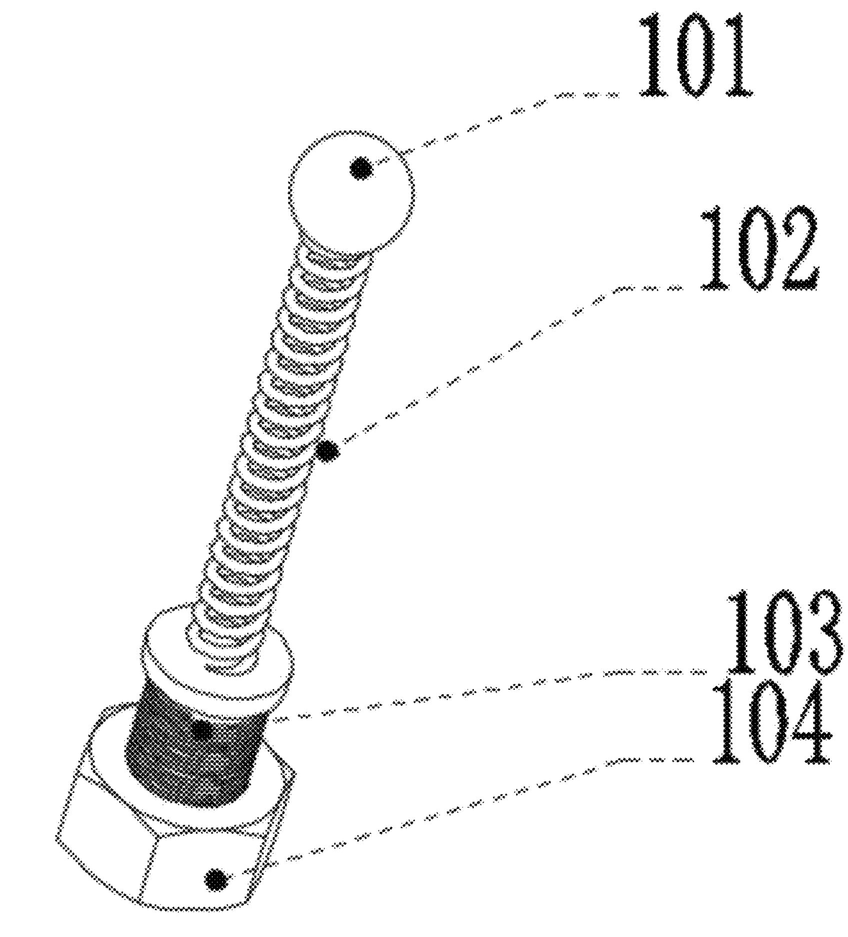
FIG. 7 illustrates a schematic structural view of a spring vibration assembly of the disclosure.

As shown in FIG. 7, the spring vibration assembly 1 includes the mass ball 101, a spring 102, the base threaded stud 103 and the positioning nut 104. The mass ball 101 is fixedly connected to a top of the spring 102, and the base threaded stud 103 is fixedly connected to a bottom of the spring 102, and a lower part of the base threaded stud 103 is connected to the positioning nut 104 in threaded connection.

Figure 8:
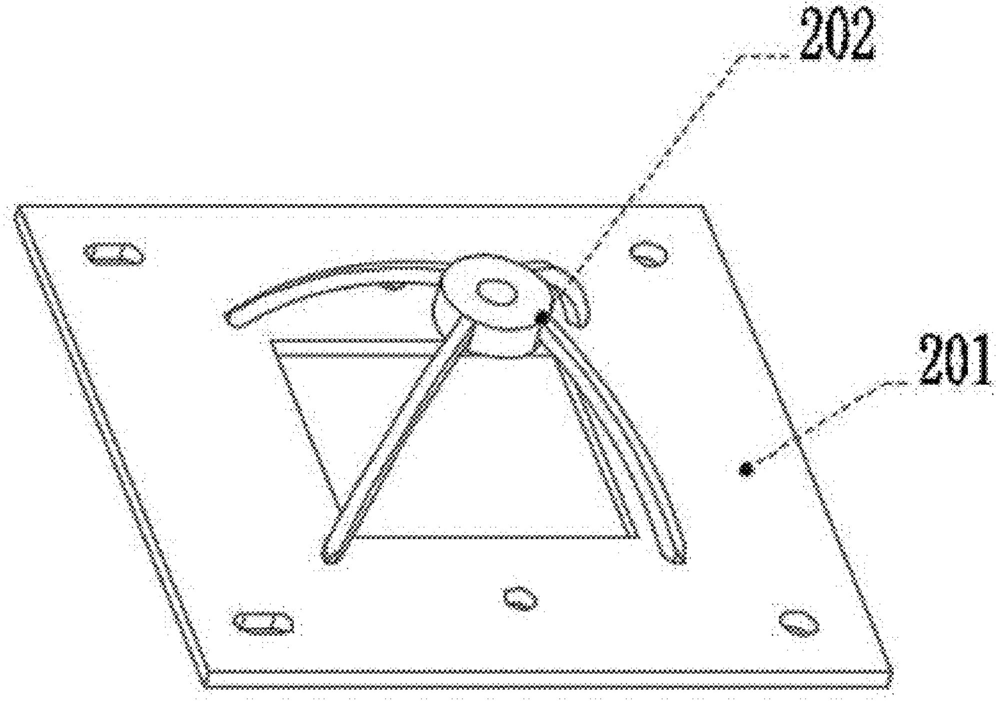
FIG. 8 illustrates a schematic structural view of a bracket of the disclosure.

As shown in FIG. 8, the bracket 2 includes a base 201 and an upper bracket 202. A bottom of the upper bracket 202 is fixedly connected to the base 201, and plays a role in supporting the spring vibration assembly 1 and positioning.

Figure 9:
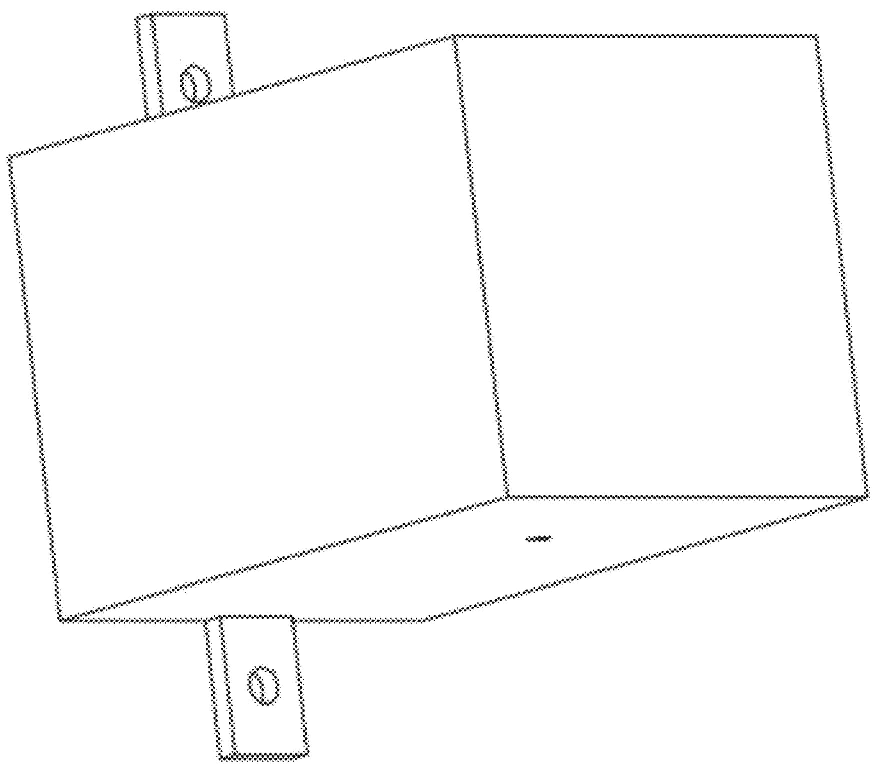
FIG. 9 illustrates a schematic structural view of a housing of the disclosure.

As shown in FIG. 9, the housing 3 has two functions, one is to prevent external interference light sources from entering the device, and the other is to serve as a support for the LED emitter 4 and the receiving processing assembly 5.

Figure 10:
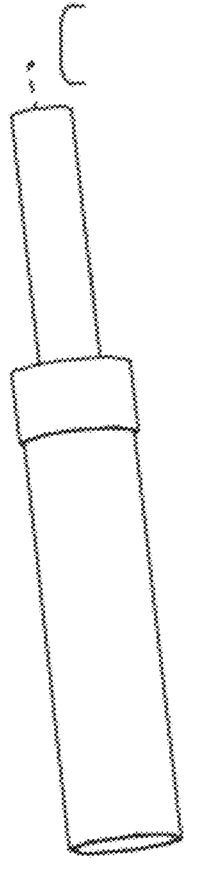
FIG. 10 illustrates a schematic structural diagram of a light-emitting (LED) emitter of the disclosure.
Figure 11:
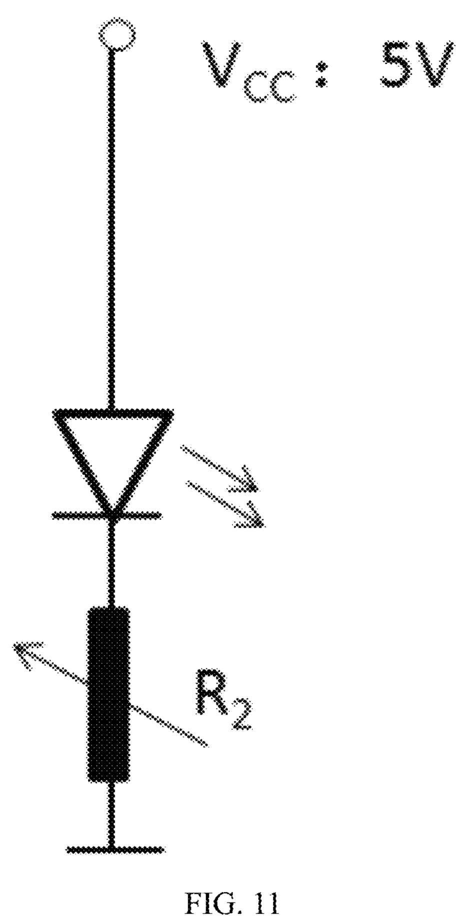
FIG. 11 illustrates a schematic circuit diagram of the LED emitter of the disclosure.

As shown in FIG. 10, the function of the LED emitter 4 is to emit constant light, and its light-emitting principle is as shown in FIG. 11. The LED emitter 4 is continuously powered by an external power supply from terminal C to make the LED emitter 4 emit light along a direction of the receiving processing assembly 5 through its own lampshade.

Figure 12:
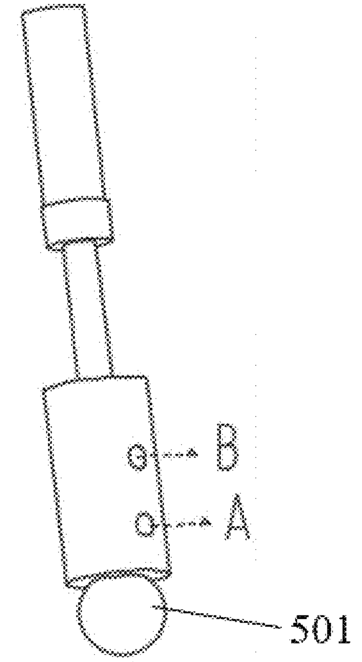
FIG. 12 illustrates a schematic structural diagram of a receiving processing assembly of the disclosure.
Figure 13:
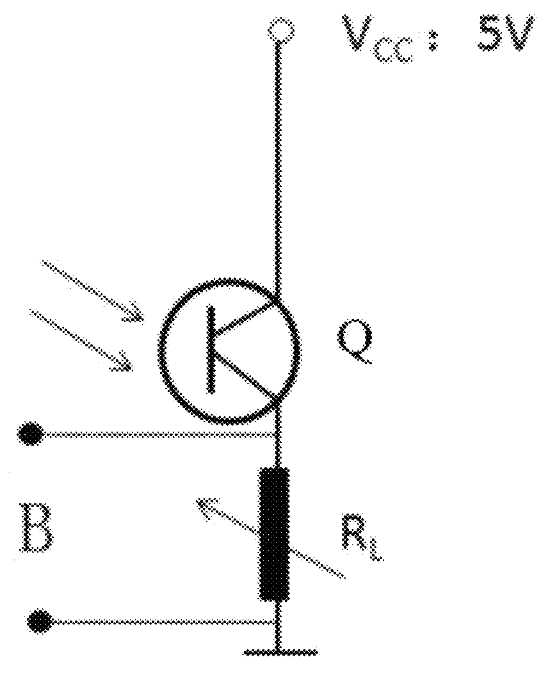
FIG. 13 illustrates a schematic circuit diagram of a receiving processing assembly of the disclosure.
Figure 14:
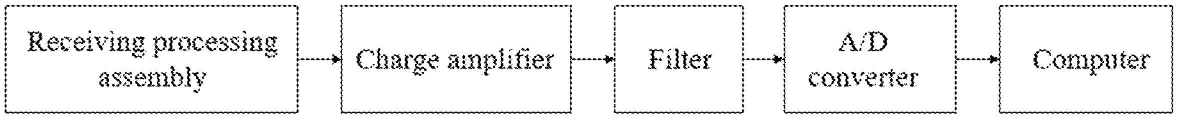
FIG. 14 illustrates a schematic diagram of an external circuit of the disclosure.

As shown in FIG. 12, the function of the receiving processing assembly 5 is to convert a received optical signal into indication information or an electrical signal that can be processed by a computer. The working principle of the receiving processing assembly 5 is shown in FIG. 13, when a photosensitive triode Q senses the light emitted by the LED emitter 4, a photosensitive receiving circuit shown in FIG. 13 will be conducted, and an indicator light 501 will emit light. At the same time, the electrical signal can be output from a port of B terminal to an external processing computer through an external circuit. The principle of the external circuit is as shown in FIG. 14, when the external circuit is powered on, the electrical signal output by the B terminal enters the computer after a charge amplifier, a filter and an analog-to-digital (A/D) converter, and the vibration characteristics of the whole train passing by are stored and recorded by the computer, so that a thickness of sand accumulated on the railway ballast bed can be judged by the duration of the circuit conduction.

The disclosure relates to a monitoring method adopting the device for monitoring railway health in a large windy desert area, which includes the following steps.

(1) When in use, the whole monitoring device is fixedly connected to a bed timber 7 of a monitoring point of a railway line with heavy wind and sand through connecting bolt groups 8, thereby forming a monitoring system. The connecting bed timber 7 does not belong to the whole monitoring device, but serves as a base for installing the device for monitoring railway health, and the external power supply (standard 5 voltages abbreviated as V) continuously supplies power to the LED emitter 4 from C terminal, and at the same time continuously supplies power to the receiving processing assembly 5 from the A terminal.

Figure 6:
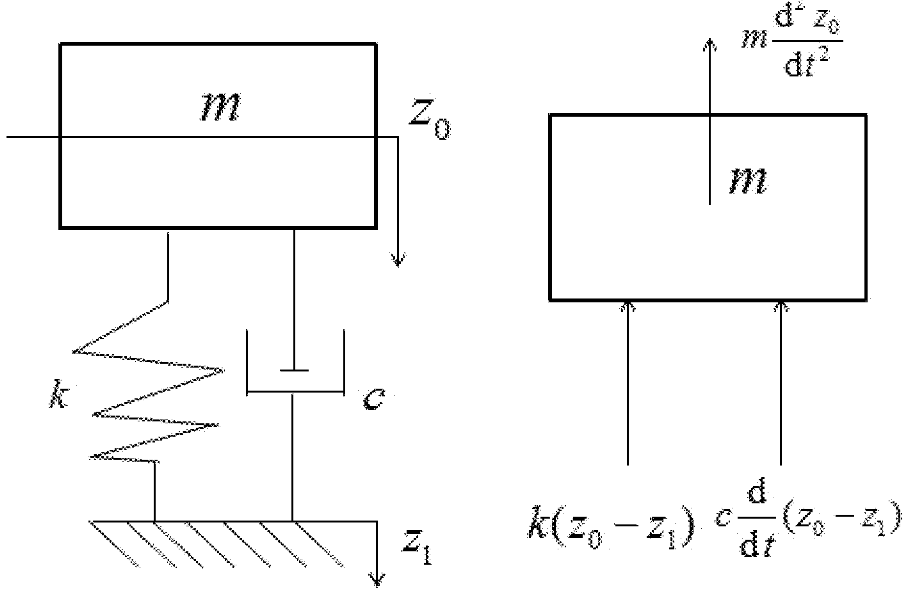
FIG. 6 illustrates a schematic diagram of forced vibration of the disclosure.

(2) As shown in FIG. 6, when a train passes by, it drives the spring vibration assembly 1 in the monitoring device to vibrate, and a force on the whole monitoring device can be expressed as:

$$m\frac{d^2 z_0}{dt^2} + c\frac{d}{dt}(z_0 - z_1) + k(z_0 - z_1) = 0.$$

In the formula, m is a system mass, c is a system damping, and k is a system stiffness. When the mass ball 101 moves relative to the bed timber 7, the relative displacement of the mass ball 101 is represented as: $z_{01}=z_0-z_1$, so the response of the whole device is:

$$m\frac{d^2 z_{01}}{dt^2} + c\frac{dz_{01}}{dt} + kz_{01} = -m\frac{d^2 z_1}{dt^2}.$$

Its frequency response H(ω) and amplitude-frequency characteristic A(ω) respectively are:

$$H(\omega) = \frac{(\omega/\omega_n)^2}{1-\left(\frac{\omega}{\omega_n}\right)^2 + 2j\xi(\omega/\omega_n)};$$

$$A(\omega) = \frac{(\omega/\omega_n)^2}{\sqrt{\left[1-(\omega/\omega_n)^2\right]^2 + (2\xi\omega/\omega_n)^2}}.$$

In the formulas:

ξ is a system damping ratio, $$\xi = \frac{c}{2\sqrt{km}};$$

ω is a system response frequency; and $\omega_n$ is a system natural frequency, and $\omega_n=\sqrt{k/m}$.

At this time, because the mass ball 101 deviates from the equilibrium position, the light emitted by the LED emitter 4 is captured by the receiving processing assembly 5. At this time, the circuit of the photosensitive triode Q in the receiving processing assembly 5 (as shown in FIG. 13) is turned on after being illuminated, and its indicator light 501 flashes. At the same time, the conducted electrical signal is obtained by the computer through the external circuit (as shown in FIG. 14), and the power-on duration is recorded.

(3) When the vibration characteristics of the whole device change after railway sand accumulation, the change can be expressed by the following formula:

$$\omega_n' = \sqrt{\frac{m}{m+m_t}}\,\omega_n.$$

In the formula, $$\omega_n'$$

is system natural frequency after sand accumulation; and $m_t$ is system added mass after sand accumulation.

Because when there is sand accumulation in the track, the vibration characteristics of the train passing through will change. This is because the added mass $m_t$ of the whole monitoring device increases sharply, and the natural frequency of the system will decrease. According to the amplitude-frequency characteristics of the system, it can be known that the whole monitoring system can return to the equilibrium position in a short time, so the flashing duration of the indicator light 501 will be reduced, and the amount of sand accumulated in the railway track can be judged by the power-on duration or the flashing duration of the indicator light 501, that is:

$$T = \frac{K}{m+m_t}.$$

In the formula, T is flashing duration of the indicator light 501 of the monitoring device after the train passes; K is a response constant of the monitoring device; $m_t$ is system added mass after sand accumulation.

In this way, the real-time monitoring of the sand accumulation in the railway track can be achieved by monitoring the flashing duration of the indicator light 501 of the receiving processing assembly 5 before and after the change of the vibration characteristics of the whole device.

One of the advantages of the disclosure is rapid installation and convenient replacement of the installation position. When the device is recovered, only the connecting bolt groups need to be unscrewed, and then the monitoring device can be recovered. When the device is installed, the above operations can be completed in reverse. The other advantage of this device is high reliability and good interchangeability. Because the vibration sensing element is a mechanical spring vibrator system, the railway health monitoring in different regions only needs to replace the mass balls with different textures. In addition, the disclosure is not limited to the health monitoring of railways in windy and sandy areas, and the health monitoring of other railway subgrade can also be monitored with reference to the technical scheme provided by the disclosure.

What is claimed is:

1. A device for monitoring railway health in a windy desert area, comprising: a spring vibration assembly, a bracket, a housing, a light-emitting diode (LED) emitter, a receiving processing assembly, and fixing screws;

wherein the spring vibration assembly and the bracket are fixedly connected through a base threaded stud and a positioning nut, the bracket and the housing are fixedly connected through the fixing screws, the LED emitter and the receiving processing assembly are fixedly connected to the housing by adhesive bonding, and the receiving processing assembly, the LED emitter and a mass ball in an equilibrium position are installed on a same straight line to ensure that a light emitted by the LED emitter is received by the receiving processing assembly when the light is unobstructed by the mass ball.

2. The device as claimed in claim 1, wherein the spring vibration assembly comprises the mass ball, a spring, the base threaded stud and the positioning nut, the mass ball is fixedly connected to a top of the spring, a bottom of the spring is fixedly connected to the base threaded stud, and a lower part of the base threaded stud is connected to the positioning nut in threaded connection.

3. The device as claimed in claim 1, wherein the bracket comprises a base and an upper bracket, and a bottom of the upper bracket is fixedly connected to the base.

4. The device as claimed in claim 1, wherein the receiving processing assembly adopts a photosensitive triode, and the photosensitive triode is configured to convert a received optical signal into indication information or an electrical signal capable of being processed by a computer.

5. A monitoring method using the device for monitoring railway health in the windy desert area as claimed in claim 1, comprising:

step (1), fixing the whole device on a bed timber of a monitoring point of a railway line with wind and sand by connecting bolt groups to form a monitoring system;

step (2), driving the mass ball in the spring vibration assembly by a train to vibrate when the train passes by, making the mass ball deviate from an equilibrium position and the light emitted by the LED emitter be received by the receiving processing assembly, after illuminating a photosensitive triode in the receiving processing assembly, conducting a circuit of the receiving processing assembly, making an indicator light flash, obtaining a conducted electrical signal by a computer through an external circuit, and recording a power-on duration; and step (3), judging sand accumulation in a railway track according to the power-on duration or a flashing duration of the indicator light, so as to achieve real-time monitoring of the sand accumulation in the railway track.

6. The monitoring method as claimed in claim 5, wherein in the step (3), the power-on duration or the flashing duration of the indicator light is:

$$T = \frac{K}{m + m_t};$$

where, T is the flashing duration of the indicator light of the device after the train passes;

K is a response constant of the device;

m is a system mass; and $m_t$ is a system added mass after sand accumulation.

* * * * *